Figure 1:
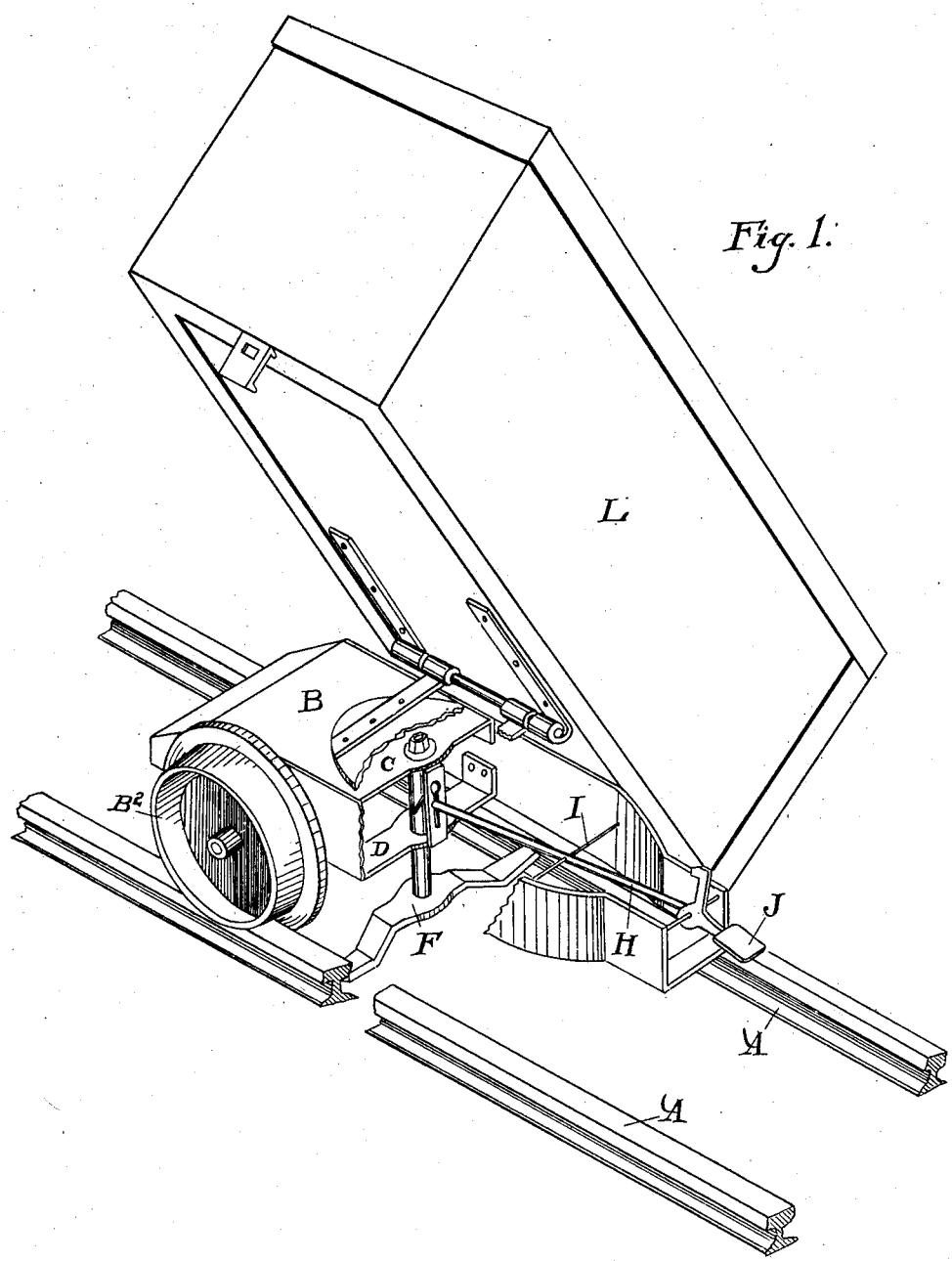

No. 737,006. PATENTED AUG. 25, 1903.
G. G. NEWCOMB.
DEVICE FOR LOCKING ORE CARS TO TRACKS.
APPLICATION FILED MAY 21, 1900. RENEWED JUNE 29, 1903.
NO MODEL. 2 SHEETS—SHEET 1.

WITNESSES
Frances Montgomery
Forest P. Higgins

INVENTOR
George G. Newcomb
By [signature]
ATTORNEY.

No. 737,006. PATENTED AUG. 25, 1903.
G. G. NEWCOMB.
DEVICE FOR LOCKING ORE CARS TO TRACKS.
APPLICATION FILED MAY 21, 1900. RENEWED JUNE 29, 1903.
NO MODEL. 2 SHEETS—SHEET 2.
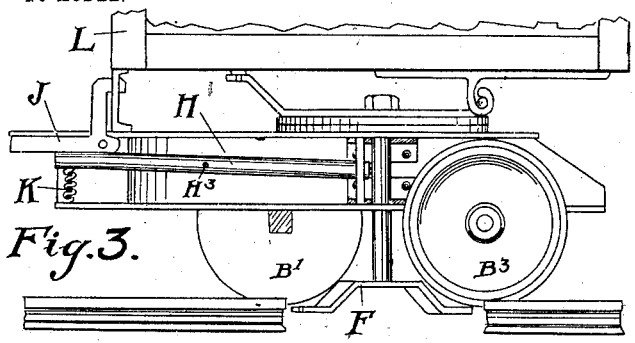
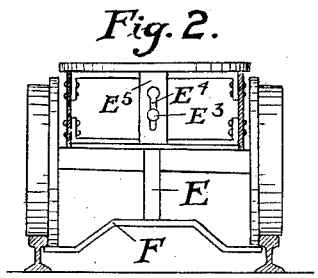
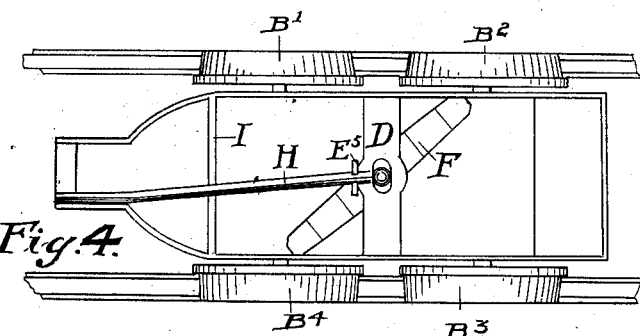
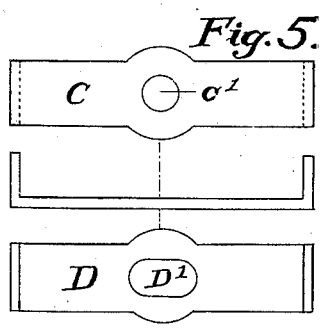
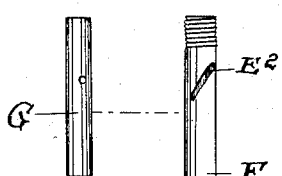
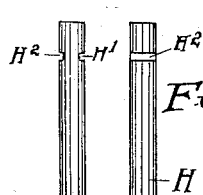
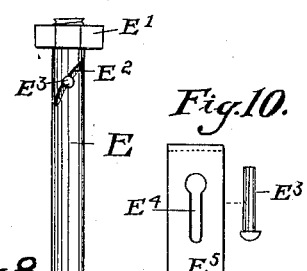
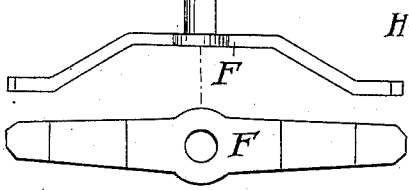
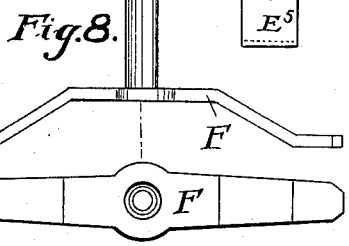
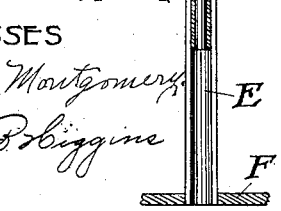
WITNESSES
Francis Montgomery
Forest B. Higgins
INVENTOR
George G. Newcomb
By ____ Attorney.

No. 737,006.

Patented August 25, 1903.

UNITED STATES PATENT OFFICE.

GEORGE G. NEWCOMB, OF DENVER, COLORADO.

DEVICE FOR LOCKING ORE-CARS TO TRACKS.

SPECIFICATION forming part of Letters Patent No. 737,006, dated August 25, 1903.

Application filed May 21, 1900. Renewed June 29, 1903. Serial No. 163,657. (No model.)

*To all whom it may concern:*

Be it known that I, GEORGE G. NEWCOMB, a citizen of the United States, residing at Denver, in the county of Arapahoe and State of Colorado, have invented certain new and useful Improvements in Devices for Locking Ore-Cars to Tracks; and I do declare the following to be a full, clear, and exact description of my invention, such as will enable others skilled in the art to which it appertains to make and use the same, reference being had to the accompanying drawings, forming a part of this specification, in which similar letters of reference indicate corresponding parts in all the figures.

My invention relates to a class of devices designed to lock cars to the track while dumping, thus preventing them from going over, which causes so much loss of time, damage to cars, and extra work for those engaged in tramming or unloading ore, coal, &c. I am aware that there are devices patented for this purpose; but they are mostly clutch devices, which are not practical.

The objects of my invention are to provide a device for locking ore-cars to the track that will be practical and effective and one that can be applied to cars that are already built, as I do not confine myself to any one mode of constructing it, but desire to cover by Letters Patent the principle involved and make it in various sizes and in such a manner as will be found applicable to the different sizes and shapes of cars to which it is to be applied.

I refer now to the drawings in further explaining the nature and objects of my invention, in which—

Figure 1 is an elevation, partly sectional, showing my device locking the car to the track while side dumping. Fig. 2 is an end view of the truck, showing my device attached. Fig. 3 is a side view, partly sectional, of the car and truck having my device attached. Fig. 4 is a view looking down upon the truck and track having my device attached. Fig. 5 is a view of the bars designed to support the device. Fig. 6 is a view of the adjusting-rod. Fig. 7 is a view of the locking-bar and the mandrel which adjusts it. Fig. 8 is a modified form of Fig. 7. Fig. 9 is a cross-section of the hollow cylindrical mandrel and the adjusting-rod. Fig. 10 is a view of the guiding plate and pin.

A A represent the ordinary T-rails used for a track for the ore-cars.

B represents the frame of the truck placed upon four flanged wheels $B'$, $B^2$, $B^3$, and $B^4$.

I employ two supporting-bars, (represented by C and D in Fig. 5 of the drawings,) which are secured to the truck-frame B, as shown in Fig. 1. The bar C has a circular aperture, (indicated by $C'$,) and the bar D has an elongated aperture, (represented by $D'$.)

E indicates the mandrel, to which is secured the locking-bar F. This mandrel E passes through the circular aperture $C'$ in the bar C and also through the elongated slot $D'$ in the bar D and is provided with a nut $E'$, upon which hangs the entire weight of the locking mechanism, as the nut $E'$ rests upon the top part of the bar C. A spiral slot $E^2$ is provided in the mandrel E. Into this mandrel is loosely inserted a similar one of smaller diameter, (designated by G in Fig. 7 of the drawings.) A pin (designated by $E^3$, Fig. 8) is provided and passed through the spiral slot $E^2$ in the large mandrel and is provided with external threads by means of which it is secured into an aperture having internal threads provided in the inner or small mandrel G. This guiding-plate $E^5$ is secured to the supporting-bars C and D in about the same manner as shown in Fig. 2 of the drawings. The pin $E^3$ is provided with a head, as represented, which extends outward and is inserted into the end of the hollow adjusting-rod H, Fig. 6. The adjusting-rod is provided with square-cut recesses or indentations $H'$ and $H^2$ and slides up and down in the slot $E^4$ of the guiding-plate $E^5$, being pivoted on the rod I, which passes through the circular aperture $H^3$, which is provided in the adjusting-rod H, as shown in Fig. 6. This adjusting-rod H passes out under the trip-finger J, (shown in Figs. 1 and 3,) or to a position convenient to be pressed down by the foot. The locking-bar F is secured to the mandrel E and is designed to swing under the flanges of the T-rails, being of a length greater than the full distance between the rails, thus causing it to come in contact with both rails before swinging to a position at right angles with the rails and preventing it from swinging around. To provide for the variation in the distance between the rails or the irregularity in the distance from the center of the truck, from which point the locking device is hung, to the rails, caused by the flanges of the wheels on one side being against the rail and those on the other side a distance of one-half inch or more from the rail, this much space being necessary, I provide the elongated slot D' in the plate D, which allows the mandrel E, supporting the locking-bar F, to swing to either side, as the case may be, and thus swing the locking cross-bar under the flanges of both rails with a certainty that would not be otherwise positive.

It is now obvious that when one of my locking devices has been constructed and applied to the car in the manner herein described the successful manipulation and operation of same will be as follows: The adjusting-rod H extends out under the trip-finger J or to some position at the rear end of the car convenient to be pressed down by the foot. If extending under the trip-finger, as shown in Figs. 1 and 3 of the drawings, the downward pressure of said trip-finger to release the car for dumping also adjusts the locking-bar F by means of the spiral slot in the large mandrel E, as the pin $E^3$, which is secured into the inner mandrel G and inserted into the end of the adjusting-rod H, passes through the spiral slot in the large mandrel, which is loose and swings in either direction. By this means the upward and downward movement of the adjusting-rod H causes the mandrel to rotate in opposite directions, also swinging the locking cross-bar in opposite directions as it is secured to the mandrel. One action—namely, the upward movement of the adjusting-rod—swings the locking-bar F under the flanges of the rails. After the load has been dumped the simple upward movement of the foot against the end of the adjusting-rod rotates the mandrel in an opposite direction, swinging the locking cross-bar to about the same position shown in Fig. 4, thus releasing it from the flanges of the rails and getting it far enough away from the rails to escape the bolts, fish-plates, and other obstructions. The spiral spring (indicated by K) shown under the adjusting-rod and trip-finger in Fig. 3 of the drawings is of sufficient strength to keep the large mandrel E and the locking-bar F from swinging around and coming in contact with the rails while the car is being passed from the mine to the dump. It also serves as a spring to operate the trip-finger which holds the box J in the proper position.

The foregoing manner of constructing my device makes it applicable to cars that have already been constructed or it can be attached to the car as it is being built.

Having thus described the nature and objects of my invention, with the manner of constructing and applying the same, what I claim as new, and desire to secure by Letters Patent of the United States, is—

1. In a device for locking cars to the rails or track, a hollow mandrel, a cross-bar attached to said hollow mandrel designed to lock under the flanges of the T-rails, a spiral slot provided in said mandrel and having a mandrel of a smaller diameter working within itself and means connected with the small mandrel and operating through the said spiral slot to rotate the large mandrel and cross-bar attached thereto, substantially as specified.

2. In a device for locking cars to the rails or track having the supporting-bars designed to support the large mandrel by means of a nut which rests upon the upper bar, the large mandrel having attached thereto the locking-bar which locks under the flanges of the rails, the mandrel of smaller diameter inserted into the large mandrel which is hung upon the supporting-bar, the inner mandrel provided with a pin which extends out through the spiral slot in the large mandrel and thence into the end of the adjusting-rod, substantially as specified.

3. In a device for locking cars to the rails or track having the cross-bar, the hollow cylindrical mandrel or journal supplied with a spiral slot, the hollow cylindrical mandrel of smaller diameter inserted into the larger one, the pin secured into the inner mandrel extending outward through the spiral slot which is provided in the large mandrel, the adjusting-rod which is pivoted upon some suitable contrivance secured to the truck and secured to the said pin by means of which the cross-bar is adjusted, substantially as specified.

4. In a device for locking cars to the rails or track, comprising the supporting-bars which are secured to the truck; upon the upper bar is hung the large mandrel by means of a nut which rests upon the top of the bar, the lower bar is provided with an elongated slot through which passes the large mandrel to which is secured the cross-bar designed to lock under the flanges of the rails, the elongated slot allows side movement of the mandrel permitting it to adjust the cross-bar so that it locks under the flange of both rails, the large mandrel is provided with a spiral slot through which passes a pin, one end of which is secured into the inner mandrel which works within the large mandrel the other end secured into the adjusting-rod which is pivoted by some contrivance attached to the truck and extends outward under the trip-finger and is kept in place by means of a spiral spring; also having the guiding-plate which guides the end of the adjusting-rod into which the pin is inserted, substantially as specified.

5. In a device for locking cars to the rails or track, the combination, comprising the supporting-bars C and D which are secured to the truck B; inserted through the circular aperture C', and swinging in the elongated aperture D' in a hollow cylindrical mandrel E which is provided with a spiral slot $E^2$, and has secured to its lower end the cross-bar F, the mandrel G inserted into the mandrel E, and has secured to it the pin $E^3$ which is extended outward through the spiral slot $E^2$ into the adjusting-rod H which is pivoted upon the rod I, the adjusting-rod extending outward under the trip-finger J being held into the desired position by means of a coiled spring, as and for the uses and purposes herein fully set forth and substantially specified.

In testimony that I claim the foregoing as my own I hereunto subscribe my name in the presence of two witnesses.

GEORGE G. NEWCOMB.

Witnesses:
 CLARA F. MONTGOMERY,
 EMILE C. NEUMEISTER.